United States Patent [19]
Kidorf et al.

[11] Patent Number: 6,052,219
[45] Date of Patent: Apr. 18, 2000

[54] WIDE BANDWIDTH RAMAN AMPLIFIER CAPABLE OF EMPLOYING PUMP ENERGY SPECTRALLY OVERLAPPING THE SIGNAL

[75] Inventors: Howard David Kidorf, Red Bank; Karsten Rottwitt, Basking Ridge, both of N.J.

[73] Assignee: Tyco Submarine Systems Ltd., Morristown, N.J.

[21] Appl. No.: 09/250,343

[22] Filed: Feb. 16, 1999

[51] Int. Cl.[7] .................................................. H01S 3/00
[52] U.S. Cl. .......................................... 359/334; 359/345
[58] Field of Search ..................................... 359/334, 345

[56] References Cited

U.S. PATENT DOCUMENTS

| | | | |
|---|---|---|---|
| 5,861,981 | 1/1999 | Jabr | 359/341 |
| 5,883,736 | 3/1999 | Oshima et al. | 359/341 |

*Primary Examiner*—Mark Hellner
*Attorney, Agent, or Firm*—Brian K. Dinicola

[57] ABSTRACT

A Raman amplifier is provided that includes at least a portion of optical fiber in which an optical signal travels. The optical fiber portion may encompass all or part of the optical transmission path of an optical communication system. A pump energy unit is provided that includes first and second pump sources providing pump power at first and second wavelengths, respectively. The first and second wavelengths generate first and second overlapping gain profiles in the optical fiber portion. An optical circulator has a first port receiving the pump power, a second port providing the pump power to the optical fiber and receiving the optical signal, and a third port transmitting the optical signal received from the second port. As a result of this arrangement, a Raman amplifier is provided in which the bandwidth is substantially increased over the bandwidth that can be achieved by the previously mentioned Raman amplifier.

10 Claims, 3 Drawing Sheets

100

WIDE BANDWIDTH RAMAN AMPLIFIER CAPABLE OF EMPLOYING PUMP ENERGY SPECTRALLY OVERLAPPING THE SIGNAL

FIELD OF THE INVENTION

The present invention relates generally to optical amplifiers, and more particularly to a Raman amplifier having a relatively wide gain profile.

BACKGROUND OF THE INVENTION

Broad bandwidth optical transmission systems have received a great deal of attention in recent years. Such systems require broad bandwidth optical amplifiers to achieve transmission of high capacity wavelength division multiplexed signals. A type of optical amplifier that is sometimes employed is a so-called distributed amplifier in which signal amplification occurs along the signal transmission path. An example of a distributed amplifier is a Raman amplifier.

Raman amplification is accomplished by introducing the signal and pump energies along the same optical fiber. The pump and signal may be copropagating or counterpropagating with respect to one another. A Raman amplifier uses stimulated Raman scattering, which occurs in silica fibers when an intense pump beam propagates through it. Stimulated Raman scattering is an inelastic scattering process in which an incident pump photon loses its energy to create another photon of reduced energy at a lower frequency. The remaining energy is absorbed by the fiber medium in the form of molecular vibrations (i.e., optical phonons). That is, pump energy of a given wavelength amplifies a signal at a longer wavelength. The relationship between the pump energy and the Raman gain for a silica fiber is shown in FIG. 1. The particular wavelength of the pump energy that is used in this example is denoted by reference numeral 1. As shown, the gain spectrum 2 for this particular pump wavelength is shifted in wavelength with respect to the pump wavelength. As FIG. 1 indicates, the bandwidth of the Raman amplifier is limited. For example, the bandwidth of the amplifier shown in FIG. 1 is only about 20 nm at a gain of 10 dB.

U.S. Appl. Ser. No. 09/030,994, filed Feb. 26, 1998 and entitled WIDE BANDWIDTH RAMAN AMPLIFIER EMPLOYING A PUMP UNIT GENERATING A PLURALITY OF WAVELENGTHS, discloses a Raman amplifier that has an increased bandwidth. This result is accomplished by providing two pump sources providing pump energy at two or more different wavelengths. As shown in FIG. 2, pump energy supplied at a wavelength denoted by reference numeral 40 generates gain curve 42 while pump energy supplied at a wavelength denoted by reference numeral 41 generates gain curve 43. The composite gain spectrum, indicated by curve 44, has a bandwidth that is greater than either of the individual gain curves 42 and 43.

Unfortunately, the bandwidth of the Raman amplifier disclosed in the previously mentioned reference cannot be increased beyond a limited amount. This limitation arises because it is not possible to provide pump energy that spectrally overlaps the signal. As a result, the wavelength separation between the pump wavelengths 40 and 41 is limited to about 100 nm, since at greater separations the pump wavelength 41 will overlap the gain curve 42 of pump wavelength 40.

Accordingly it would be desirable to provide a Raman amplifier in which the bandwidth could be substantially increased over the bandwidth that can be achieved by the Raman amplifier disclosed in U.S. Appl. Ser. No. 09/030,994.

SUMMARY OF THE INVENTION

In accordance with the present invention, a Raman amplifier is provided that includes at least a portion of optical fiber in which an optical signal travels. The optical fiber portion may encompass all or part of the optical transmission path of an optical communication system. A pump energy unit is provided that includes first and second pump sources providing pump power at first and second wavelengths, respectively. The first and second wavelengths generate first and second overlapping gain profiles in the optical fiber portion. An optical circulator has a first port receiving the pump power, a second port providing the pump power to the optical fiber and receiving the optical signal, and a third port transmitting the optical signal received from the second port. As a result of this arrangement, a Raman amplifier is provided in which the bandwidth is substantially increased over the bandwidth that can be achieved by the previously mentioned Raman amplifier.

DETAILED DESCRIPTION

Figure 3:
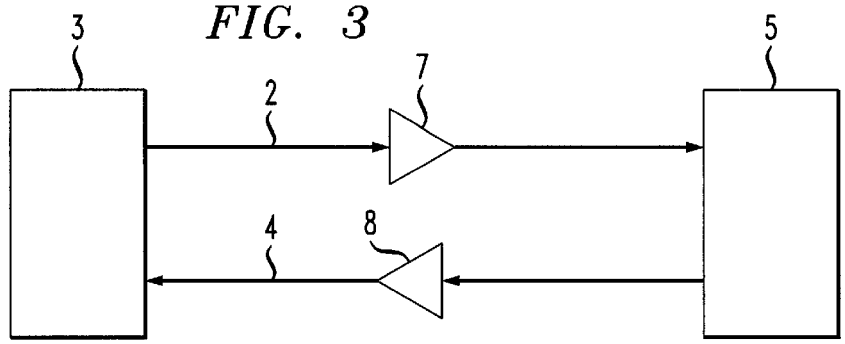
FIG. 3 shows an optical communication system that employs optical amplifiers.

Referring to FIG. 3, there is disclosed a lightwave communication system which utilizes optical fiber amplifiers such as Raman amplifiers. The system includes transmitter/receiver terminals 3 and 5 and optical transmission fiber paths 2 and 4 supporting bi-directional communication. The signals being transmitted from the terminals 3 and 5 are in optical form. There is no intermediate conversion to electrical form. A plurality of optical amplifiers 7 and 8 are interposed in the fiber paths 2 and 4 between the transmitter/receiver terminals 3 and 5. Optical amplifiers 7 and 8 contain a length of fiber that provides a gain medium, an energy source that pumps the fiber to provide gain, and a means of coupling the pump energy into the fiber without interfering with the signal being amplified. In the case of Raman amplifiers, the fiber providing the gain medium is the transmission path itself. These components of the optical amplifiers are shown in greater detail in FIG. 4. While only one pair of optical amplifiers is depicted in FIG. 3 for clarity of discussion, it should be understood by those skilled in the art that the present invention finds application in transmission paths of all lengths having many additional pairs of optical amplifiers.

Figure 4:
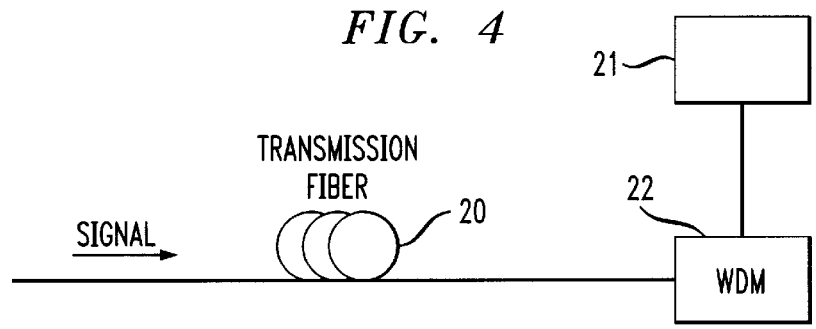
FIG. 4 shows the pertinent details of a known Raman amplifier.

Referring to FIG. 4, each distributed optical amplifier includes an optical fiber portion 20 of the transmission path in which Raman gain is to be generated. This portion 20 of fiber may vary in size and may be limited, for example, to a small section of the transmission path. Alternatively, the fiber portion 20 in which Raman gain is generated may have a length encompassing the entire transmission path. The fiber portion 20 is coupled to a source of optical pump energy 21 via a coupler 22 such as a wavelength division multiplexer (WDM).

Figure 1:
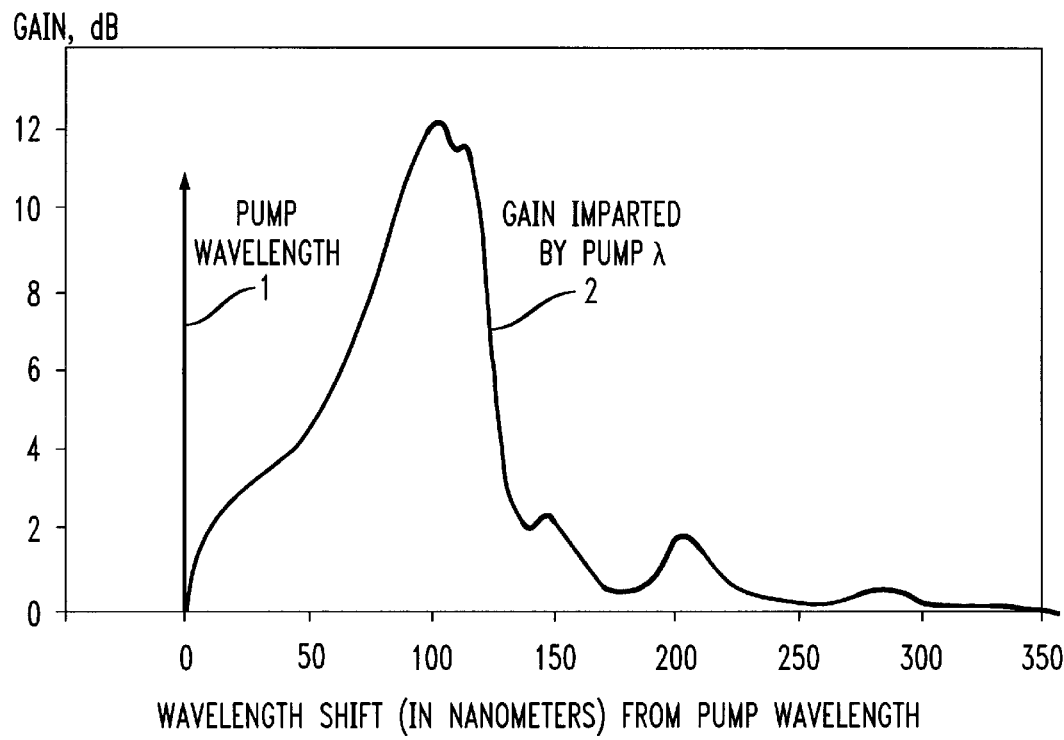
FIG. 1 shows the relationship between pump energy and Raman gain for a silica fiber.
Figure 2:
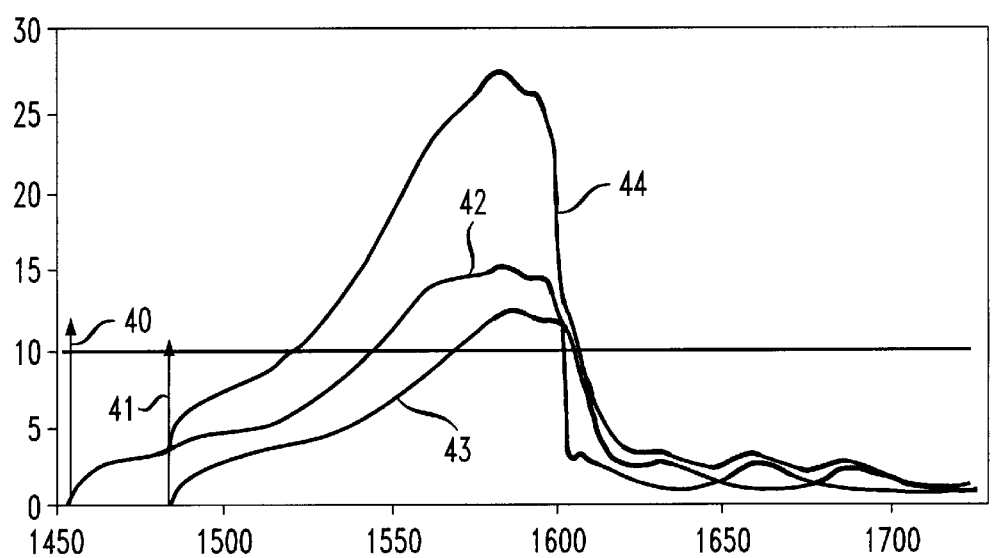
FIG. 2 shows the Raman gain provided by the Raman amplifier shown in FIG. 5.
Figure 5:
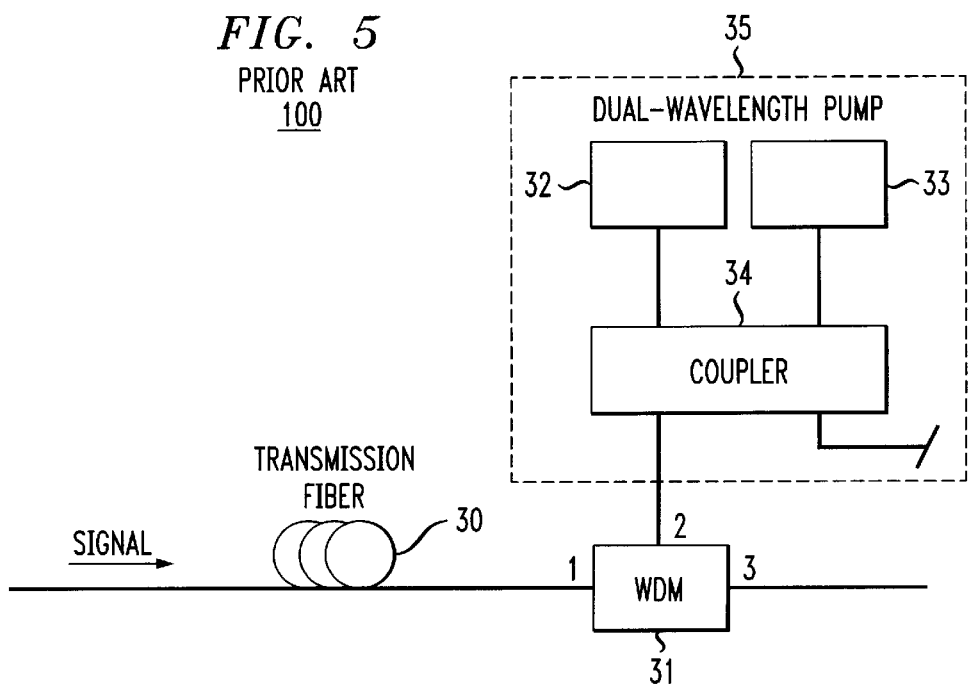
FIG. 5 shows another example of a Raman amplifier

FIG. 5 shows a Raman amplifier 100 of the type disclosed in U.S. Appl. Ser. No. 09/030,994. Pairs of Raman amplifiers 100 may be used in a transmission system such as shown in FIG. 2. Similar to FIG. 4, the Raman amplifier 100 includes optical fiber portion 30 in which Raman gain is generated and an optical pump unit 35 coupled to the fiber portion 30 by an optical coupler 31 The pump unit 35 includes first and second optical pump sources 32 and 33. An optical coupler 34 combines the energy from pump sources 32 and 33 and directs the resulting beam to WDM coupler 31. As previously explained, the pump sources 32 and 33 generate pump energy at different wavelengths selected to maximize the amplifier bandwidth. For example, pump source 32 may provide pump energy at 1455 nm and pump source 33 may provide pump energy at 1495 nm to amplify a WDM signal ranging from 1530–1610 nm.

Figure 6:
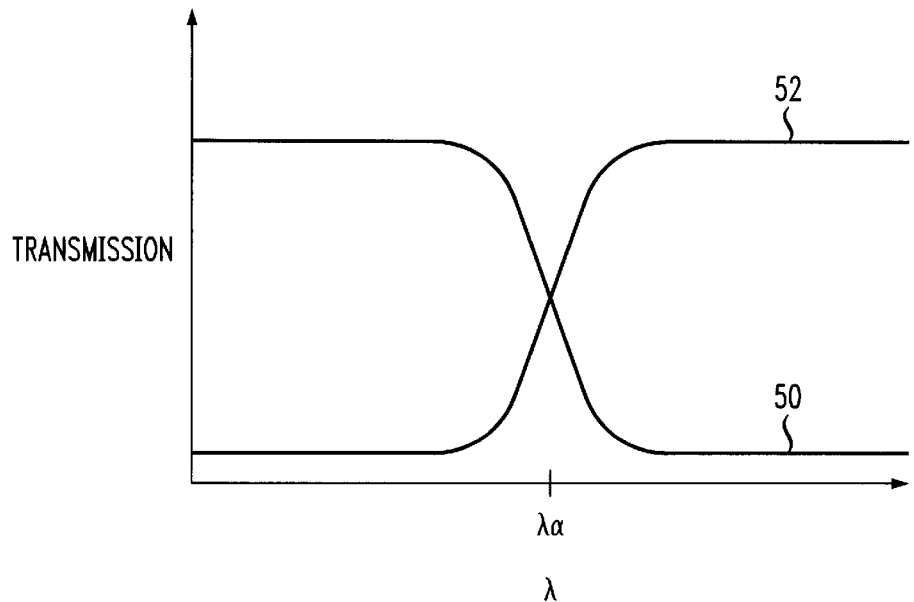
FIG. 6 shows the normalized transmission characteristics of a WDM coupler.

FIG. 6 shows the normalized transmission characteristics of the WDM coupler 31 as a function of wavelength. Curve 50 denotes the normalized transmission characteristics of the pump path traversed by the pump energy from port 2 to port 1 of WDM 31 (see FIG. 5). As shown, the transmission is high at wavelengths less than $\lambda a$ and is substantially less at wavelengths greater than $\lambda ka$. That is, the pump path provides a high transmission at pump wavelengths and a lower transmission at the greater signal wavelengths. $\lambda a$ corresponds to the maximum wavelength at which pump energy may be supplied. For a signal centered at about 1560 nm, for example, $\lambda a$ is at about 1500 nm.

Curve 52 in FIG. 6 denotes the normalized transmission characteristics of the signal path traversed by the WDM signal from port 1 to port 3 of WDM 31. Because of the nature of the WDM coupler 31, curve 52 is essentially the mirror image of curve 50. That is, the signal path provides a low transmission at pump wavelengths and a higher transmission at signal wavelengths.

It is evident from FIG. 6 that the wavelengths of the pump energy and the signal cannot overlap. Such an overlap could arise if two pump wavelengths are used which are sufficiently separated so that the longer pump wavelength overlaps the Raman gain curve generated by the shorter pump wavelength. For example, referring again to FIG. 2, if the separation between pump wavelengths 40 and 41 is greater than about 100 nm, the pump wavelength 41 will overlap the gain curve 42 (which is generated by pump wavelength 40). Accordingly, the maximum separation between the pump wavelengths is limited, thus limiting the maximum bandwidth of the corresponding composite gain curve (curve 44 in FIG. 2) for the amplifier.

Figure 7:
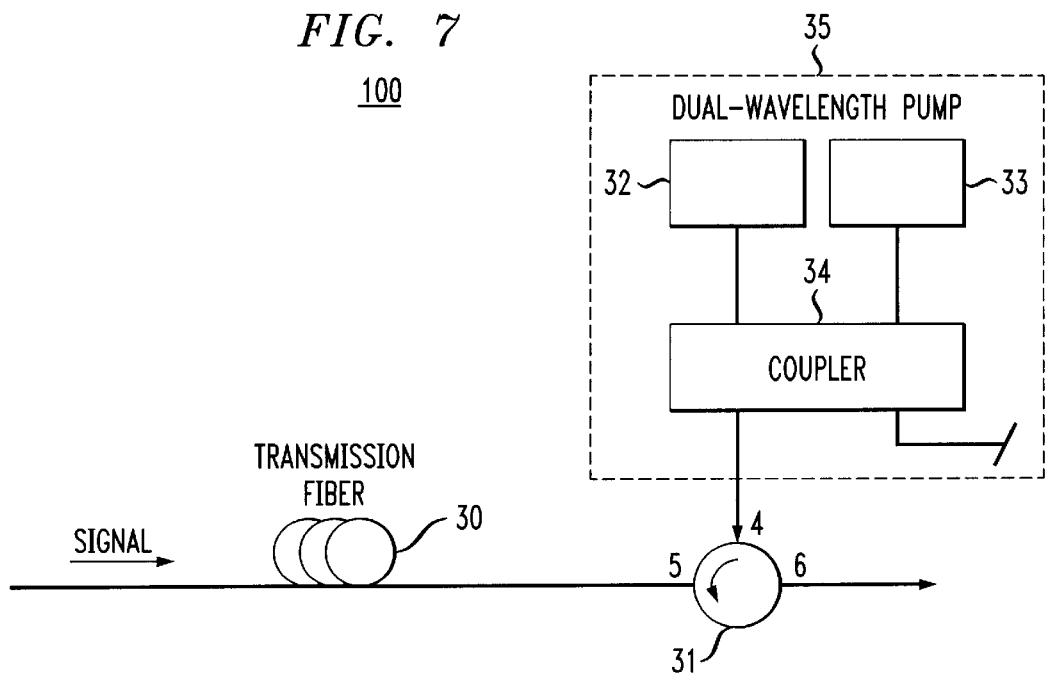
FIG. 7 shows a Raman amplifier constructed in accordance with the present invention.

In accordance with the present invention, this limitation is overcome by replacing WDM coupler 31 with a circulator. FIG. 7 shows one embodiment of the Raman amplifier constructed in accordance with the present invention. In FIGS. 5 and 7, like reference numerals denote like elements. The Raman amplifier 100 includes optical fiber portion 30 in which Raman gain is generated and an optical pump unit 35 coupled to the fiber portion 30 by a three port optical circulator 31. The circulator 31 has ports 4, 5, and 6 in which port 5 is located downstream from port 4 and port 6 is located downstream from port 5. That is, optical energy is transported through the circulator 31 in a counterclockwise direction. The pump unit 35 includes first and second optical pump sources 32 and 33. An optical coupler 34 combines the energy from pump sources 32 and 33 and directs the resulting beam to port 4 of circulator 31. As previously explained, the pump sources 32 and 33 generate pump energy at different wavelengths selected to increase the amplifier bandwidth. For example, pump source 32 may provide pump energy at 1455 nm and pump source 33 may provide pump energy at 1495 nm to amplify a WDM signal ranging from 1530–1610 nm.

In operation, the pump energy is supplied to the transmission fiber 30 by entering port 4 of the circulator 31 and exiting via port 5. The signal propagating along transmission fiber 30 enters port 5 of circulator 31 and exits via port 6. Accordingly, as long as the bandwidth of the circulator 31 is sufficiently wide, the circulator 31 can accommodate pump and signal wavelengths that overlap. In contrast, the design of the WDM coupler shown in FIG. 5 inherently prevents the pump and signal wavelengths from overlapping.

What has been described is merely illustrative of the application of the principles of the present invention. Other arrangements and methods can be implemented by those skilled in the art without departing from the spirit and scope of the present invention. For example, the advantages that accrue by combining optical pump sources is not limited to combining two different wavelengths. More generally, a plurality of pump wavelengths may be used to further tailor the resulting bandwidth of the Raman amplifier.

We claim:

1. A Raman amplifier, comprising:

at least a portion of optical fiber in which an optical signal travels for providing a gain medium;

a pump energy unit that include first and second pump sources providing pump power at first and second wavelengths, respectively, said first and second wavelengths generating first and second overlapping gain profiles in said optical fiber portion; and an optical circulator having a first port receiving said pump power, a second port providing said pump power to said optical fiber and receiving said optical signal, and a third port transmitting said optical signal received from the second port.

2. The amplifier of claim 1 wherein said pump energy unit includes an optical coupler for combining said first and second wavelengths.

3. The amplifier of claim 2 wherein said optical signal is a wavelength division multiplexed signal and said optical coupler is a wavelength division multiplexing coupler.

4. The amplifier of claim 1 further comprising a third optical source providing pump power at a third wavelength different from said first and second wavelengths.

5. An optical transmission system, comprising:

first and second transmitter/receiver terminals remotely located with respect to one another;

an optical transmission path coupling said first terminal to said second terminal;

a Raman amplifier providing gain to an optical signal in at least a portion of said optical transmission path, said amplifier including;

a pump energy unit that include first and second pump sources providing pump power at first and second wavelengths, respectively, said first and second wavelengths generating overlapping first and second gain profiles in said optical path portion;

an optical circulator having a first port receiving said pump power, a second port providing said pump power to said optical path and receiving said optical signal, and a third port transmitting said optical signal received from the second port.

6. The system of claim 5 wherein said pump energy unit includes an optical coupler for combining said first and second wavelengths.

7. The system of claim 6 wherein said optical signal is a wavelength division multiplexed signal and said optical coupler is a wavelength division multiplexing coupler.

8. The system of claim 5 further comprising a third optical source providing pump power at a third wavelength different from said first and second wavelengths.

9. The amplifier of claim 1 wherein said first and second wavelengths are 1455 nm and 1495 nm, respectively.

10. The system of claim 1 wherein said first and second wavelengths are 1455 nm and 1495 nm, respectively.

* * * * *